(12) United States Patent
Matsumura et al.

(10) Patent No.: US 12,732,331 B2
(45) Date of Patent: Sep. 8, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 305 days.

(21) Appl. No.: 18/707,784

(22) PCT Filed: Nov. 10, 2022

(86) PCT No.: PCT/JP2022/041875
§ 371 (c)(1),
(2) Date: May 6, 2024

(87) PCT Pub. No.: WO2023/085353
PCT Pub. Date: May 19, 2023

(65) Prior Publication Data
US 2026/0163700 A1 Jun. 11, 2026

(30) Foreign Application Priority Data
Nov. 12, 2021 (JP) ................................ 2021-185044

(51) Int. Cl.
*H04L 5/00* (2006.01)
*H04W 72/23* (2023.01)

(52) U.S. Cl.
CPC ............ *H04L 5/0053* (2013.01); *H04L 5/001* (2013.01); *H04W 72/23* (2023.01)

(58) Field of Classification Search
CPC ....... H04L 5/0053; H04L 5/001; H04W 72/23
See application file for complete search history.

(56) References Cited

U.S. PATENT DOCUMENTS

2021/0152293 A1* 5/2021 Hosseini ............... H04L 1/1854
2023/0006798 A1* 1/2023 Lee ....................... H04L 5/0055
(Continued)

FOREIGN PATENT DOCUMENTS

WO 2021/161544 A1 8/2021

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Ricky Q Ngo
*Assistant Examiner* — Kabir U Jahangir
(74) *Attorney, Agent, or Firm* — Osha Bergman Watanabe & Burton LLP

(57) ABSTRACT

A terminal according to an aspect of the present disclosure includes: a receiving section configured to receive a downlink control information (DCI) format indicating a transmission configuration indication (TCI) state; and a control section configured to apply the TCI state to a plurality of types of at least one of a channel and a signal at a timing after at least a specific time from uplink transmission based on the DCI format, in which the uplink transmission is a positive acknowledgement based on the DCI format in a first case, and the uplink transmission is the positive acknowledgement or a negative acknowledgement based on the DCI format in a second case different from the first case. According to one aspect of the present disclosure, a timing at which a TCI state is applied can be appropriately determined.

7 Claims, 8 Drawing Sheets

(56) References Cited

U.S. PATENT DOCUMENTS

2023/0072323 A1 3/2023 Matsumura et al.
2023/0412320 A1* 12/2023 Lei ........................ H04L 1/1854

OTHER PUBLICATIONS

International Search Report issued in corresponding International Application No. PCT/JP2022/041875, mailed on Jan. 31, 2023 (5 pages).
Written Opinion issued in corresponding International Application No. PCT/JP2022/041875, mailed on Jan. 31, 2023 (4 pages).
ZTE; "Enhancements on Multi-beam Operation"; 3GPP TSG RAN WG1 Meeting #106bis-e, R1-2108870; e-Meeting; Oct. 11-19, 2021 (27 pages).

* cited by examiner

FIG. 1A configuration for DL&UL (RRC)

SSB/ CSI-RS/ SRS activation for DL&UL (MAC CE)

active TCI pool for DL&UL joint indication indication for DL&UL (DCI)

Figures 1A, 1B:
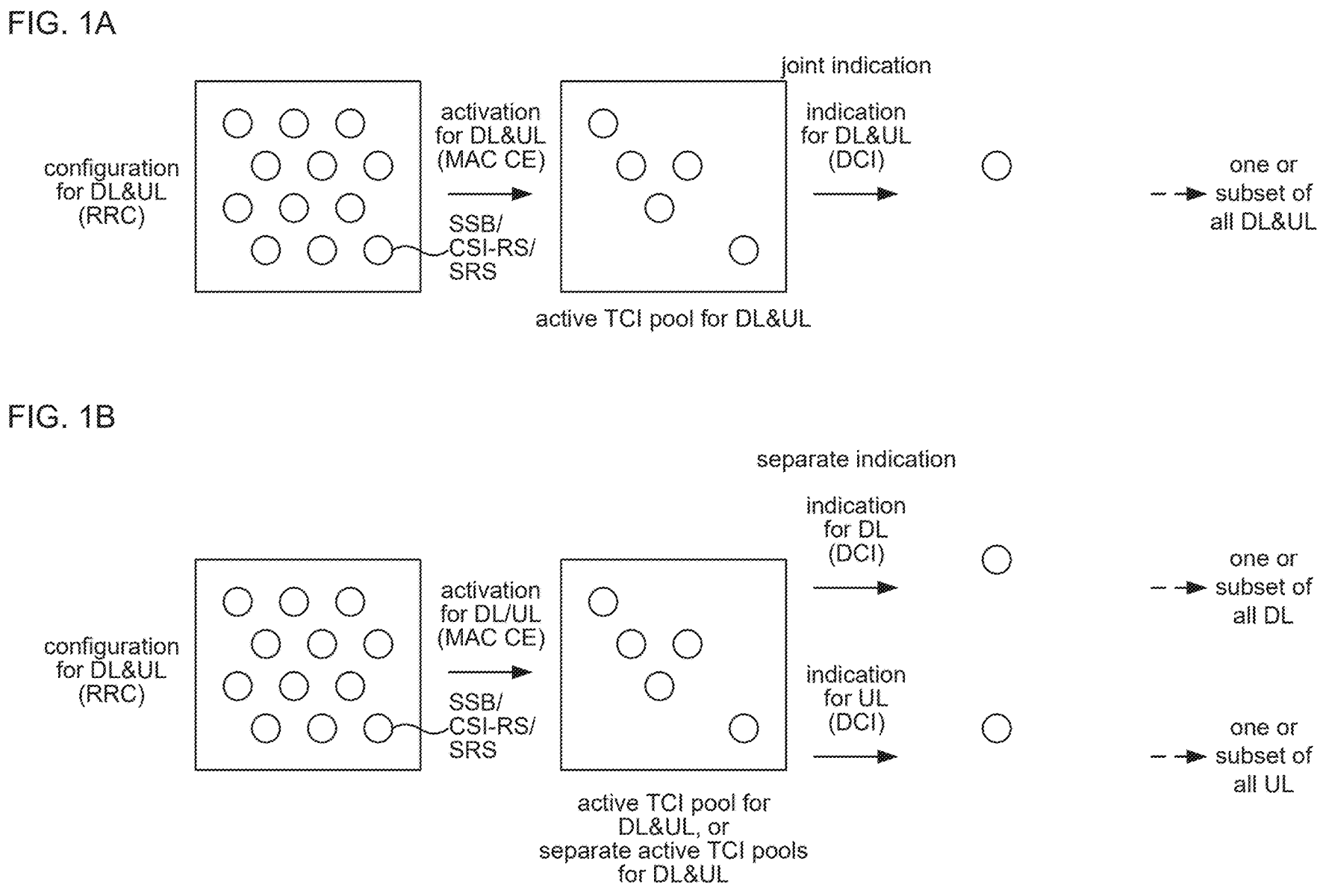

one or subset of all DL&UL

FIG. 1B configuration for DL&UL (RRC)

SSB/ CSI-RS/ SRS activation for DL/UL (MAC CE)

active TCI pool for DL&UL, or separate active TCI pools for DL&UL separate indication indication for DL (DCI)

one or subset of all DL indication for UL (DCI)

one or subset of all UL

BEAM INDICATION:
TCI state #2
DCI
PDSCH
ACK
Y symbols
slot
BAT
TCI state #2 IS APPLIED
TIME BEAM INDICATION:
TCI state #2
DCI
PDSCH
ACK/NACK
Y symbols
slot
BAT
TCI state #2 IS APPLIED
TIME

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). Furthermore, the specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1:3GPP TS 36.300 V 8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future radio communications system, it is considered that a transmission configuration indication (TCI) state for one or more channels/signals is indicated by one piece of downlink control information (DCI).

However, when a UE receives the DCI indicating the TCI state, it is not clear from which timing the TCI state is applied. When a timing at which the TCI state is applied is not clear, communication quality/communication throughput may deteriorate.

Therefore, an object of the present disclosure is to provide a terminal, a radio communication method, and a base station that appropriately determine a timing at which a TCI state is applied.

Solution to Problem

A terminal according to an aspect of the present disclosure includes: a receiving section configured to receive a downlink control information (DCI) format indicating a transmission configuration indication (TCI) state; and a control section configured to apply the TCI state to a plurality of types of at least one of a channel and a signal at a timing after at least a specific time from uplink transmission based on the DCI format, in which the uplink transmission is a positive acknowledgement based on the DCI format in a first case, and the uplink transmission is the positive acknowledgement or a negative acknowledgement based on the DCI format in a second case different from the first case.

Advantageous Effects of Invention

According to one aspect of the present disclosure, a timing at which a TCI state is applied can be appropriately determined.

BRIEF DESCRIPTION OF DRAWINGS

FIG. 1 FIGS. 1A and 1B illustrate an example of a unified TCI state.

FIG. 3 FIGS. 3A and 3B illustrate an example of a first embodiment.

Figure 2:
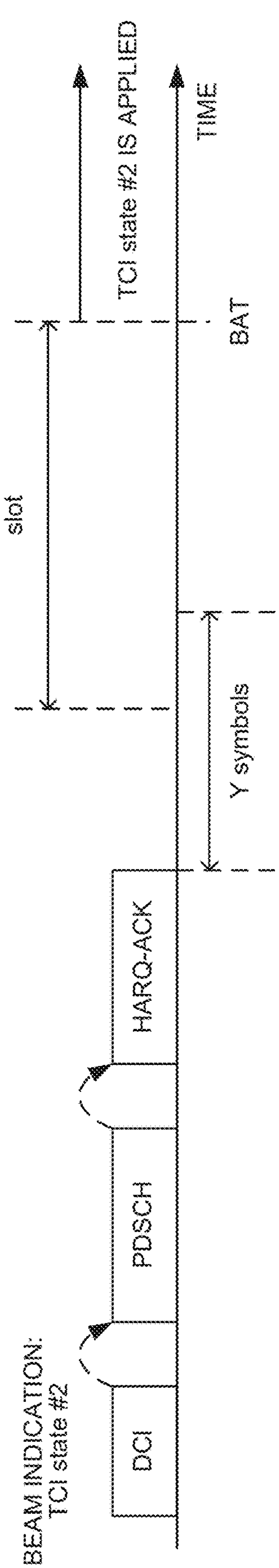
FIG. 2 illustrates an example of a BAT.

DESCRIPTION OF EMBODIMENTS (TCI, Spatial Relation, and QCL)

In NR, controlling reception processing (for example, at least one of reception, demapping, demodulation, and decoding) and transmission processing (for example, at least one of transmission, mapping, precoding, modulation, and coding) in a UE of at least one of a signal and a channel (expressed as a signal/channel) based on a transmission configuration indication state (TCI state) is being studied.

The TCI state may represent what is applied to a downlink signal/channel. A state corresponding to the TCI state applied to an uplink signal/channel may be expressed as a spatial relation.

The TCI state is information on a quasi-co-location (QCL) of the signal/channel and may also be referred to as a spatial Rx parameter, spatial relation information, or the like. The TCI state may be configured in the UE for each channel or each signal.

The QCL is an indicator indicating a statistical property of the signal/channel. For example, this may mean that, when a certain signal/channel and another signal/channel have a QCL relationship, it may be assumed that at least one of a Doppler shift, a Doppler spread, an average delay, a delay spread, and a spatial parameter (for example, the spatial Rx parameter) is the same (the QCL for at least one of the foregoing) between the plurality of different signals/channels.

It is noted that the spatial Rx parameter may correspond to a UE reception beam (for example, a reception analog beam), and the beam may be specified based on a spatial QCL. A QCL (or at least one element of the QCL) in the present disclosure is interchangeable with a spatial QCL (sQCL).

A plurality of types of QCL (QCL types) may be defined. For example, parameters (or parameter sets) of four different QCL types A to D that can be assumed to be identical may be provided, and the corresponding parameters (which may be referred to as QCL parameters) are described as follows:

QCL type A (QCL-A): Doppler shift, Doppler spread, average delay, and delay spread;

QCL type B (QCL-B): Doppler shift and Doppler spread;

QCL type C (QCL-C): Doppler shift and average delay; and

QCL type D (QCL-D): spatial Rx parameter.

It may be referred to as a QCL assumption for the UE to assume that a certain control resource set (CORESET), channel, or reference signal has a specific QCL (for example, QCL type D) relationship with another CORESET, channel, or reference signal.

Based on a TCI state of the signal/channel or the QCL assumption, the UE may also determine at least one of a transmission beam (Tx beam) and a reception beam (Rx beam) of the corresponding signal/channel.

The TCI state may be, for example, information on the QCL of a target channel (in other words, a reference signal (RS) for the corresponding channel) and another signal (for example, another RS). The TCI state may be configured (indicated) by higher layer signaling, physical layer signaling, or a combination thereof.

A channel for which a TCI state or a spatial relation is configured (designated) may be, for example, at least one of a physical downlink shared channel (PDSCH), a physical downlink control channel (PDCCH), a physical uplink shared channel (PUSCH), and a physical uplink control channel (PUCCH).

Furthermore, an RS having a QCL relationship with the channel may be, for example, at least one of a synchronization signal block (SSB), a channel state information reference signal (CSI-RS), a sounding reference signal (SRS), a tracking CSI-RS (also called a tracking reference signal (TRS)), and a QCL detection reference signal (also called a QRS).

The SSB is a signal block including at least one of a primary synchronization signal (PSS), a secondary synchronization signal (SSS), and a broadcast channel (physical broadcast channel (PBCH)). The SSB may be referred to as an SS/PBCH block.

An RS of QCL type X in a TCI state may mean an RS in a QCL type X relationship with (DMRS of) a certain channel/signal, and this RS may be referred to as a QCL source of QCL type X in the TCI state.

(Unified/Common TCI Framework)

According to a unified TCI framework, UL and DL channels can be controlled by a common framework. The unified TCI framework may indicate the common beam (common TCI state) and apply the indicated common beam to all UL and DL channels, or apply the common beam for UL to all UL channels and apply the common beam for DL to all DL channels, instead of defining the TCI state or spatial relation for each channel as in Rel. 15.

One common beam for both DL and UL, or the common beam for DL and the common beam for UL (two common beams in total) have been considered.

The UE may assume the same TCI state (joint TCI state, joint TCI pool, joint common TCI pool, joint TCI state set) for UL and DL. The UE may assume different TCI states (separate TCI state, separate TCI pool, UL separate TCI pool and DL separate TCI pool, separate common TCI pool, UL common TCI pool, and DL common TCI pool) for each of UL and DL.

The UL and DL default beams may be aligned by beam management based on MAC CE (MAC CE level beam indication). The default TCI state of the PDSCH may be updated to match a default UL beam (spatial relation).

Beam management based on the DCI (DCI level beam indication) may indicate the common beam/unified TCI state from the same TCI pool (joint common TCI pool, joint TCI pool, set) for both UL and DL. X (>1) TCI states may be activated by the MAC CE. The UL/DL DCI may select one from the X active TCI states. The selected TCI state may be applied to the channels/RSs of both UL and DL.

The TCI pool (set) may be a plurality of TCI states configured by an RRC parameter, or may be a plurality of TCI states (active TCI state, active TCI pool, set) activated by the MAC CE among the plurality of TCI states configured by the RRC parameter. Each TCI state may be a QCL type A/D RS. The SSB, the CSI-RS, or the SRS may be configured as the QCL type A/D RS.

The number of TCI states corresponding to each of one or more TRPs may be defined. For example, the number N (≥1) of TCI states (UL TCI states) applied to the UL channel/RS and the number M (≥1) of TCI states (DL TCI states) applied to the DL channel/RS may be defined. At least one of N and M may be notified/configured/indicated to the UE via higher layer signaling/physical layer signaling.

In the present disclosure, when described as N=M=X (X is any integer), it may mean that the UE is notified/configured/indicated of a TCI state (joint TCI state) common to X (corresponding to X TRPs) ULs and DLs. In addition, when described as N=X (X is any integer) and M=Y (Y is any integer, Y=X may be possible), it may mean that X (corresponding to X TRPs) UL TCI states and Y (corresponding to Y TRPs) DL TCI states (that is, separate TCI state) are respectively notified/configured/indicated to the UE.

For example, when described as N=M=1, it may mean that a TCI state common to one UL and DL for a single TRP is notified/configured/indicated to the UE (joint TCI state for a single TRP).

In addition, for example, when described as N=1 and M=1, it may mean that one UL TCI state and one DL TCI state for a single TRP are separately notified/configured/indicated to the UE (separate TCI state for a single TRP).

In addition, for example, when described as N=M=2, it may mean that a TCI state common to a plurality of (two) ULs and DLs for a plurality of (two) TRPs is notified/configured/indicated to the UE (joint TCI state for a plurality of TRPs).

In addition, for example, when described as N=2 and M=2, it may mean that a plurality of (two) UL TCI states and a plurality of (two) DL TCI states for a plurality of (two) TRPs are notified/configured/indicated to the UE (separate TCI state for a plurality of TRPs).

It is noted that, in the above example, the case where the values of N and M are 1 or 2 has been described, but the values of N and M may be 3 or more, and may be different for N and M.

In the example of FIG. 1A, the RRC parameter (information element) configures a plurality of TCI states for both DL and UL. The MAC CE may activate a plurality of TCI states among the configured plurality of TCI states. The DCI may indicate one of the plurality of TCI states activated. The DCI may be UL/DL DCI. The indicated TCI state may be applied to at least one (or all) of the UL/DL channels/RSs. One piece of DCI may indicate both UL TCI and DL TCI.

In the example of this drawing, one point may be one TCI state applied to both UL and DL, or two TCI states applied to UL and DL, respectively.

At least one of the plurality of TCI states configured by the RRC parameter and the plurality of TCI states activated by the MAC CE may be referred to as a TCI pool (common TCI pool, joint TCI pool, TCI state pool). The plurality of TCI states activated by the MAC CE may be referred to as an active TCI pool (active common TCI pool).

It is noted that, in the present disclosure, a higher layer parameter (RRC parameter) for configuring the plurality of TCI states may be referred to as configuration information for configuring the plurality of TCI states, and may be simply referred to as "configuration information". In addition, in the present disclosure, the indication of one of the plurality of TCI states by using the DCI may be receiving indication information indicating one of the plurality of TCI states included in the DCI, or may be simply receiving "indication information".

In the example of FIG. 1B, the RRC parameter configures a plurality of TCI states for both DL and UL (joint common TCI pool). The MAC CE may activate a plurality of TCI states (active TCI pool) among the configured plurality of TCI states. Active TCI pools (separate) for UL and DL may be configured/activated.

DL DCI or a new DCI format may select (indicate) one or more (for example, one) TCI states. The selected TCI state may be applied to one or more (or all) DL channels/RSs. The DL channel may be PDCCH/PDSCH/CSI-RS. The UE may determine the TCI state of each channel/RS of the DL using the operation of the TCI state in Rel. 16 (TCI framework). UL DCI or a new DCI format may select (indicate) one or more (for example, one) TCI states. The selected TCI state may be applied to one or more (or all) UL channels/RSs. The UL channel may be PUSCH/SRS/PUCCH. In this way, different pieces of DCI may separately indicate UL TCI and DL DCI.

The existing DCI format 1_1/1_2 may be used to indicate the common TCI state.

Beam indication DCI for a unified/common TCI state may be a DCI format 1_1/1_2 with DL assignment (scheduling).

The beam indication DCI for the unified/common TCI state may be a DCI format 1_1/1_2 without the DL assignment (scheduling) or a new DCI format. This is beneficial in a case in which there is no DL data but there is a beam indication for the unified/common TCI state.

The common TCI framework may have separate TCI states for DL and UL.

For M=N=1 in the separate DL/UL TCI of the unified TCI framework of Rel. 17, it has been considered that one instance of a beam indication using the DCI format 1_1/1_2 (with/without the DL assignment) follows at least one of the following beam indications 1 to 3.

[Beam Indication 1] One TCI field code point represents a pair of the DL TCI state and the UL TCI state. When the DCI indicates such a TCI field code point, the UE applies the corresponding DL TCI state and UL TCI state.

[Beam Indication 2] One TCI field code point represents only the DL TCI state. When the DCI indicates such a TCI field code point, the UE applies the corresponding DL TCI state and maintains the UL TCI state.

[Beam Indication 3] One TCI field code point represents only the UL TCI state. When the DCI indicates such a TCI field code point, the UE applies the corresponding UL TCI state and maintains the DL TCI state.

In the present disclosure, a TCI state pool, a TCI state list, a unified TCI state pool, a joint TCI, a joint TCI state pool, a separate TCI state pool, a separate DL/UL TCI state pool, a DL TCI state pool, a UL TCI state pool, a separate DL TCI state pool, a separate UL TCI state pool, and a separate UL TCI may be interchangeable with each other.

(Beam Indication DCI for Unified TCI)

For beam indication using the unified TCI in Rel. 17, it is considered that the UE supports the DCI format 1_1/1_2 (beam indication DCI) without the DL assignment. A mechanism of ACK/NACK for the beam indication may use a mechanism similar to a mechanism of ACK/NACK for SPS PDSCH release using HARQ-ACK codebooks of a type 1 and a type 2.

In response to successful reception of the beam indication DCI, the UE may report the ACK. In response to a reception failure of the beam indication DCI, the UE may report the NACK.

For the type 1 HARQ-ACK codebook, a location of ACK information in the HARQ-ACK codebook may be determined based on a virtual PDSCH indicated by a time domain resource assignment (TDRA) field in the beam indication DCI on the basis of a time domain arrangement list configured for the PDSCH. For the type 2 HARQ-ACK codebook, a location of the ACK information in the HARQ-ACK codebook may be determined according to the same rule as a rule for semi-persistent scheduling (SPS) release.

The ACK may be reported in PUCCH after k slots from the end of the PDCCH reception. Here, k may be indicated by a PDSCH-to-HARQ feedback timing indication field within the DCI format, or if there is no PDSCH-to-HARQ feedback timing indication field in the DCI, k may be provided by RRC IE (dl-Data ToUL-ACK or dl-Data ToUL-ACK-ForDCIFormat1-2-r16).

When the DCI is used for the beam indication, CS-RNTI is used for scrambling CRC for the DCI, and a DCI field may have the following values.

RV=ALL '1'

MCS=all '1'

NDI=0

All '0' for FDRA type 0, or all '1' for FDRA type 1, or all '0' for dynamicSwitch The following DCI fields may be used as in Rel. 16.

Identifier for DCI formats

Carrier indicator

Bandwidth part indicator

TDRA

Downlink assignment index (if configured)

TPC command for scheduled PUCCH

PUCCH resource indicator

PDSCH-to-HARQ_feedback timing indicator (if present)

Remaining unused DCI fields and code points may be reserved in Rel. 17.

The UE may report whether a TCI update is supported by the DCI format 1_1/1_2.

The UE supporting the TCI update by the DCI format 1_1/1_2 may be required to support the TCI update by the DCI format 1_1/1_2 without the DL assignment.

The ACK/NACK of the PDSCH scheduled by the DCI carrying the beam indication may be used for the ACK of the DCI.

(HARQ-ACK of Multi-TRPs)

As a Hybrid Automatic Repeat reQuest ACKnowledgement (HARQ-ACK) feedback for multi-PDSCHs, a separate HARQ-ACK feedback and a joint HARQ-ACK feedback have been studied. In the present disclosure, "separate" may be interchangeable with "independent".

The separate HARQ-ACK feedback (which may also be referred to as separate feedback or separate HARQ-ACK) corresponds to a feedback in which the UE transmits HARQ-ACK for each TRP by using separate physical uplink control channel (PUCCH)/physical uplink shared channel (PUSCH) resources. The plurality of PUCCH/PUSCH resources may overlap each other (may be transmitted simultaneously) or may not overlap each other (for example, TDM/FDM may be performed).

When the separate HARQ-ACK is used, HARQ-ACK can be independently transmitted for each TRP. Even when the backhaul delay between TRPs is large (for example, TRPs are connected to each other by non ideal backhaul), the delay of the HARQ does not increase.

The joint HARQ-ACK feedback (which may be referred to as a joint feedback, joint HARQ-ACK, or the like) corresponds to a feedback in which the UE transmits HARQ-ACKs of a plurality of TRPs together on the same PUCCH/PUSCH resource.

When the joint HARQ-ACK is used, one PUCCH/PUSCH transmission is sufficient, so that resource overhead can be reduced. When the backhaul delay between TRPs is small (for example, TRPs are connected to each other by ideal backhaul), the HARQ-ACK transmitted to one TRP can be delivered to the other TRP with a low delay.

In Rel. 16 NR, the UE may configure a feedback mode by a higher layer parameter (which may be referred to as a "ackNackFeedbackMode", a "ackNackFeedbackMode-r16", an ACKNACK feedback mode, or the like) indicating whether the feedback mode used in one slot is a joint feedback or a separate feedback.

One or a plurality of pieces of DCI that schedules the multi-PDSCHs may include a field of the PUCCH resource indicator (PRI). The PRI corresponds to information for designating a resource for transmitting HARQ-ACK corresponding to a PDSCH, and may be referred to as an ACK/NACK resource indicator (ARI).

The UE may determine the PUCCH resource for transmitting the HARQ-ACK corresponding to the above-described multi-PDSCHs based on the PRI.

(Hybrid Automatic Repeat Request Acknowledgement (HARQ-ACK) Codebook)

In the NR, the UE may transmit the HARQ-ACK feedback by using one PUCCH resource in units of HARQ-ACK codebooks including one or more bits of delivery acknowledgement information (for example, hybrid automatic repeat request acknowledgement (HARQ-ACK)). The HARQ-ACK bits may be referred to as HARQ-ACK information, HARQ-ACK information bits, or the like.

Here, the HARQ-ACK codebook may include bits for the HARQ-ACKs in at least one unit of a time domain (for example, a slot), a frequency domain (for example, component carrier (CC)), a spatial domain (for example, a layer), a transport block (TB), and a code block group (CBG) constituting the TB. The HARQ-ACK codebook may be simply referred to as a codebook.

It is noted that the number (size) of bits included in the HARQ-ACK codebook or the like may be determined in a semi-static or dynamic manner. The HARQ-ACK codebook of which the size is determined semi-statically is also referred to as, for example, a semi-static HARQ-ACK codebook or a type 1 HARQ-ACK codebook. The HARQ-ACK codebook of which the size is determined dynamically is also referred to as, for example, a dynamic HARQ-ACK codebook or a type 2 HARQ-ACK codebook.

Which one of the type 1 HARQ-ACK codebook and the type 2 HARQ-ACK codebook is to be used may be configured in the UE by using a higher layer parameter (for example, pdsch-HARQ-ACK-codebook).

For the type 1 HARQ-ACK codebook, the UE may feed back, in a certain range (for example, a range configured on the basis of the higher layer parameter), the HARQ-ACK bit for a PDSCH candidate (or PDSCH occasion) corresponding to the range, regardless of whether or not there is PDSCH scheduling.

The certain range may be determined on the basis of at least one of a period (for example, a set of a specific number of occasions for receiving the candidate PDSCH or a specific number of monitoring occasions of the PDCCH), the number of CCs configured or activated in the UE, the number of TBs (the number of layers or rank), the number of CBGs per one TB, or the presence or absence of application of spatial bundling. The range is also referred to as a HARQ-ACK window, a HARQ-ACK bundling window, a HARQ-ACK feedback window, or the like.

In the type 1 HARQ-ACK codebook, even when scheduling of a PDSCH for UE is not performed, the UE secures a bit for the PDSCH in the codebook in the range. In a case where it is determined that the PDSCH is not actually scheduled, the UE can feed back the bit as a NACK bit.

For the type 1 HARQ-ACK codebook, regardless of reception of DCI/PDSCH, the DCI does not need to include DAI because the HARQ-ACK codebook size is constant.

Each HARQ-ACK bit (corresponding DCI/PDSCH) in the type 1 HARQ-ACK codebook for one TRP may be indexed. Indexes may be set in ascending order of frequencies (for example, a serving cell (CC) index). The indexes may be in ascending order of time (for example, PDCCH monitoring occasion) for the same frequency.

Meanwhile, in a case of the type 2 HARQ-ACK codebook, the UE may feed back the HARQ-ACK bit for the PDSCH that is scheduled within the range.

Specifically, the UE may determine the number of bits of the type 2 HARQ-ACK codebook on the basis of a field (for example, a downlink assignment indicator (index) (DAI) field) in the DCI. It is noted that the DAI field may include a counter DAI (C-DAI) and a total DAI (T-DAI).

The C-DAI may indicate a counter value of downlink transmission (PDSCH, data, and TB) scheduled within a certain period. For example, the C-DAI in the DCI for scheduling data within the period may indicate the number counted in the frequency domain (for example, the CC) first and then in the time domain within the period. For example, the C-DAI may correspond to a value obtained by counting PDSCH receptions or semi-persistent scheduling (SPS) releases in ascending order of serving cell indexes and then in ascending order of PDCCH monitoring occasions regarding one or more pieces of DCI included in the period.

That is, the C-DAI may mean the cumulative number of pairs of {serving cells and PDCCH monitoring occasions} for each piece of data up to the current serving cell and the current PDCCH monitoring occasion.

The T-DAI may indicate a total value (total number) of pieces of data scheduled within a certain period. For example, the T-DAI in the DCI for scheduling data in a certain time unit (for example, the PDCCH monitoring occasion) within the period may indicate the total number of pieces of data scheduled up to the time unit (also referred to as a point, a timing, or the like) within the period.

That is, the T-DAI may mean a value which corresponds to the total number of pairs of {serving cells and PDCCH monitoring occasions} for each piece of data up to the current PDCCH monitoring occasion and which is updated for each PDCCH monitoring occasion.

For the type 2 HARQ-ACK codebook, the DCI includes the DAI, so that understanding of the HARQ-ACK codebook size can be common between the base station and the UE. Each HARQ-ACK bit (corresponding DCI/PDSCH) in the type 2 HARQ-ACK codebook for one TRP may be indexed. The indexes may be in ascending order of time (for example, PDCCH monitoring occasion). The indexes may be in ascending order of frequencies (for example, the serving cell (CC) index) for the same time.

The type 3 HARQ-ACK codebook may be referred to as a one-shot HARQ-ACK codebook. When the one-shot HARQ-ACK codebook (for example, pdsch-HARQ-ACK-OneShotFeedback) is configured, a DCI format 1_1 may request the UE to report ACK/NACK for all CCs and all HARQ processes configured in a PUCCH group.

By the way, in Rel. 16 NR studied so far, CORESETs of different CORESET pool indexes are used to schedule different PDSCHs (multi-DCI-based multi-TRPs).

Therefore, in Rel. 16 NR, when the first CORESET and the second CORESET described above are configured in the UE and the separate feedback is configured ("ackNackFeedbackMode—r16"="separate" is configured), it is specified that the UE separately performs generation/reporting of HARQ-ACK information related to the first CORESET and generation/reporting of HARQ-ACK information related to the second CORESET for the type 1 and the type 2 HARQ-ACK codebooks.

It is noted that, in the present disclosure, the "first TRP", the "TRP1", the "first CORESET", and the "CORESET in which CORESET pool index is not provided or CORESET pool index value=0 is provided" may be interchangeable with each other. Furthermore, the "first CORESET" may also mean one or a plurality of first CORESETs.

It is noted that, in the present disclosure, the "second TRP", the "TRP2", the "second CORESET", and the "CORESET in which the value of the CORESET pool index=1 is provided" may be interchangeable with each other. Furthermore, the "second CORESET" may also mean one or a plurality of second CORESETs.

On the other hand, the two CORESETs (also written in this disclosure as "two linked CORESETs for PDCCH repetition") associated with the two linked SS sets described above are used for repeated transmission of DCI of the same payload. In other words, the two linked CORESETs may be used to schedule the same PDSCH.

(Determination of PUCCH Resource for HARQ-ACK Information)

For a PUCCH with the HARQ-ACK information, the UE determines a PUCCH resource after determining a set of PUCCH resources for the number of HARQ-ACK information bits. PUCCH resource determination is performed based on a PUCCH resource indicator field in the last DCI format if there are a plurality of specific DCI formats. The plurality of specific DCI formats are a plurality of DCI formats having a value of a PDSCH-to-HARQ_feedback timing indicator field, or a value of dl-DataToUL-ACK, or dl-Data ToUL-ACK-r16, or dl-Data ToUL-ACKForDCIFormat 1-2, indicating the same slot for PUCCH transmission, and are a plurality of DCI formats detected by the UE, and are a plurality of DCI formats for transmitting corresponding HARQ-ACK information in the PUCCH. In the PUCCH resource determination, a plurality of detected specific DCI formats are first indexed in ascending order of serving cell indexes for the same PDCCH monitoring occasion, and then are indexed in ascending order of PDCCH monitoring occasion indexes. In the indexing of a plurality of DCI formats in one serving cell for the same PDCCH monitoring occasion index, if the UE is not provided with a CORESET pool index for one or more first CORESETs on the active DL BWPs of one serving cell, or is provided with a CORESET pool index with a value of 0, and is provided with a CORESET pool index with a value of 1 for one or more second CORESETs, and is with ackNackFeedbackMode=joint for the active UL BWPs, the DCI format detected from the PDCCH reception in the first CORESET is indexed earlier than the DCI format detected from the PDCCH reception in the second CORESET.

(Beam Application Time(BAT))

The following studies 1 and 2 have been studied regarding application time (BAT) of the indication of the beam/unified TCI state in DCI-based beam indication in Rel. 17.

[Study 1]

It has been considered that a first slot applying the indicated TCI is at least a Y symbol after the last symbol of positive acknowledgement (acknowledgement (ACK)) for joint or separate DL/UL beam indication (FIG. 2). The Y symbol may be configured by the base station based on UE capability. The UE capability may be reported in units of symbols. It is also studied that the first slot applying the indicated TCI is at least a Y symbol after the last symbol of an ACK/negative acknowledgement (NACK) for the joint or separate DL/UL beam indication.

According to study 1, the BAT is determined on the basis of the Y symbol, but when the SCS is different among a plurality of CCs, the BAT is different among the plurality of CCs because a value of the Y symbol is also different.

[Study 2]

For the case of CA, the application time of the beam indication may be set according to any one of the following options 1 to 3.

[Option 1] Both the first slot and the Y symbol are determined on a carrier with a minimum SCS within one or more carriers having the beam indication applied thereto.

[Option 2] Both the first slot and the Y symbol are determined on the carrier with the minimum SCS within the one or more carriers having the beam indication applied thereto and a UL carrier that carries the ACK.

[Option 3] Both the first slot and the Y symbol are determined on the UL carrier that carries the ACK.

As a CC simultaneous beam update function of Rel. 17, it has been studied to make beams common among a plurality of CCs in CA. According to study 2, the BAT among the plurality of CCs is common.

However, when a UE receives the DCI indicating the TCI state, it is not clear from which timing the TCI state is applied. For example, an opportunity for determining a timing is not clear. When the timing at which the TCI state is applied is not clear on the basis of the DCI, communication quality/communication throughput may deteriorate.

Therefore, the present inventors have conceived a method of appropriately determining the timing at which the TCI state is applied.

Hereinafter, embodiments according to the present disclosure will be described in detail with reference to the drawings. The radio communication method according to each of the embodiments may be applied independently, or may be applied in combination with others.

In the present disclosure, "A/B" and "at least one of A or B" may be interchangeable with each other. Furthermore, in the present disclosure, "A/B/C" may mean "at least one of A, B, and C".

In the present disclosure, activate, deactivate, indicate (or specify), select, configure, update, determine, and the like may be interchangeable with each other. In the present disclosure, support, control, can control, operate, can operate, and the like may be interchangeable with each other.

In the present disclosure, radio resource control (RRC), an RRC parameter, an RRC message, an upper layer parameter, an information element (IE), a setting, and the like may be interchangeable with each other. In the present disclosure, a Medium Access Control control element (MAC control element (CE)), an update command, an activation/deactivation command, and the like may be interchangeable with each other.

In the present disclosure, the higher layer signaling may be any of, for example, radio resource control (RRC) signaling, medium access control (MAC) signaling, broadcast information, and the like, or a combination thereof.

In the present disclosure, the MAC signaling may use, for example, the MAC control element (MAC CE), a MAC protocol data unit (PDU), or the like. The broadcast information may be, for example, a master information block (MIB), a system information block (SIB), remaining minimum system information (RMSI), other system information (OSI), or the like.

In the present disclosure, the physical layer signaling may be, for example, downlink control information (DCI), uplink control information (UCI), or the like.

In the present disclosure, an index, an identifier (ID), an indicator, a resource ID, and the like may be interchangeable with each other. In the present disclosure, a sequence, a list, a set, a group, a cohort, a cluster, a subset, and the like may be interchangeable with each other.

In the present disclosure, a panel, a UE panel, a panel group, a beam, a beam group, a precoder, an uplink (UL) transmission entity, a transmission and reception point (transmission/reception point (TRP)), a base station, spatial relation information (SRI), a spatial relation, an SRS resource indicator (SRI), a control resource set (CORESET), a physical downlink shared channel (PDSCH), a codeword (CW), a transport block (TB), a reference signal (RS), an antenna port (for example, a demodulation reference signal (DMRS) port), an antenna port group (for example, a DMRS port group), a group (for example, a spatial relation group, a code division multiplexing (CDM) group, a reference signal group, a CORESET group, a physical uplink control channel (PUCCH) group, a PUCCH resource group), a resource (for example, a reference signal resource and an SRS resource), a resource set (for example, a reference signal resource set), a CORESET pool, a downlink transmission configuration indication state (TCI state) (DL TCI state), an uplink TCI state (UL TCI state), a unified TCI state, a common TCI state, a quasi-co-location (QCL), QCL assumption, and the like may be interchangeable with each other.

In the present disclosure, the TCI state, the common TCI state, the unified TCI state, the TCI state applicable to DL and UL, the TCI state applicable to a plurality of (a plurality of types of) channels/RSs, the TCI state applicable to a plurality of types of channels/RSs, the joint TCI state of DL and UL, the TCI state of UL and DL for the joint TCI indication, the separate TCI state of DL/UL, the TCI state of UL only for separate TCI indication, and the TCI state of DL only for the separate TCI indication may be interchangeable with each other.

In the present disclosure, a plurality of TCI states configured by the RRC, a plurality of TCI states activated by the MAC CE, a pool, a TCI state pool, an active TCI state pool, a common TCI state pool, a joint TCI state pool, a separate TCI state pool, a common TCI state pool for the UL, a common TCI state pool for the DL, a common TCI state pool configured/activated by an RRC/MAC CE, and TCI state information may be interchangeable with each other.

In the present disclosure, the channel/RS having the unified TCI applied thereto may be PDCCH/PDSCH/HARQ-ACK information/PUCCH/PUSCH/CSI-RS/SRS.

In the present disclosure, the DCI, the DCI format, the beam indication, the beam indication DCI, the TCI (state) indication DCI, the DCI with the TCI indication (field), and the DCI format 1_0/1_1/1_2 may be interchangeable with each other.

(Radio Communication Method)

In each embodiment, the unified TCI may be simply represented as a TCI state, a beam, or the like. In other words, the TCI state in each embodiment may be applied to one or more types of channel/RS.

In each embodiment, the beam indication, the beam indication DCI, the TCI field, the DCI format with the TCI field, the DCI format indicating the TCI state, the beam indication DCI, the TCI state indication DCI, the specific DCI may be interchangeable with each other.

In each embodiment, the HARQ-ACK information corresponding to the DCI, the ACK corresponding to the DCI, the UL transmission scheduled/triggered by the DCI, the HARQ-ACK information corresponding to the PDSCH scheduled by the DCI, and the UL transmission at the UL transmission timing indicated by the DCI may be interchangeable with each other. In each embodiment, the UL transmission, the HARQ-ACK information, the ACK, the ACK/NACK, the HARQ-ACK codebook, the HARQ-ACK codebook of the type 1/2/3, and the PUCCH/PUSCH/SRS may be interchangeable with each other.

In each embodiment, the DCI format (specific DCI) with the TCI field may be a DCI format in which the TCI field is present (is configured) within a designated DCI format. In each embodiment, the DCI format without the TCI field may be a DCI format except a designated DCI format with the TCI field, may include a DCI format 1_0, or may include a designated DCI format without the TCI field. The designated DCI format may include the DCI format 1_1/1_2, may include a group common DCI format (for example, DCI format 2_x), or may include a UL grant DCI format (for example, DCI format 0_x). The designated DCI format may be at least one of the DCI format with the DL assignment and the DCI format without the DL assignment.

In each embodiment, the BAT may be the first slot after at least the Y symbol from the last symbol of the transmission of the ACK for the beam indication DCI, may be the first slot after at least the Y symbol from the last symbol of the transmission of the ACK/NACK for the beam indication DCI, or may be the first slot after at least the Y symbol from the last symbol of the specific UL transmission for the target DCI. In each embodiment, the ACK for the beam indication DCI, the ACK/NACK for the beam indication DCI, the specific UL transmission for the beam indication DCI, and the opportunity/trigger of the BAT may be interchangeable with each other.

In each embodiment, the ACK/NACK, the ACK and the NACK, the ACK or the NACK may be interchangeable with each other.

Y may be given by an RRC parameter (for example, BeamApp Time-r17, timeDurationForQCL-r17). For CA, Y may be based on the minimum subcarrier spacing (SCS) within the CCs (cells) to which the beam is applied.

The UE may transmit the ACK/NACK for the DCI format without the DL assignment indicating the beam. The UE may update the indicated beam (TCI state) at a specific timing after transmission of the ACK.

The UE may transmit the ACK/NACK for the PDSCH scheduled by a DCI format to the DCI format that indicates the beam and is with the DL assignment. The UE may update the indicated beam (TCI state) at a specific timing after transmission of the ACK.

The UE may transmit the ACK/NACK for the DCI format that indicates the beam and is with the DL assignment. The UE may update the indicated beam (TCI state) at a specific timing after transmission of the ACK.

In each embodiment, a first case, a first specific case, a case in which it is configured that the opportunity of the BAT is ACK transmission, and a first specific case in which it is configured that the opportunity of the BAT is the ACK transmission may be interchangeable with each other.

In each embodiment, a second case, a second specific case, a case in which it is configured that the opportunity of the BAT is ACK/NACK transmission, and a second specific case in which it is configured that the opportunity of the BAT is the ACK/NACK transmission may be interchangeable with each other.

First Embodiment

This embodiment relates to the opportunity/trigger of the BAT.

<<Aspect 1-1>>

Figures 3A, 3B:
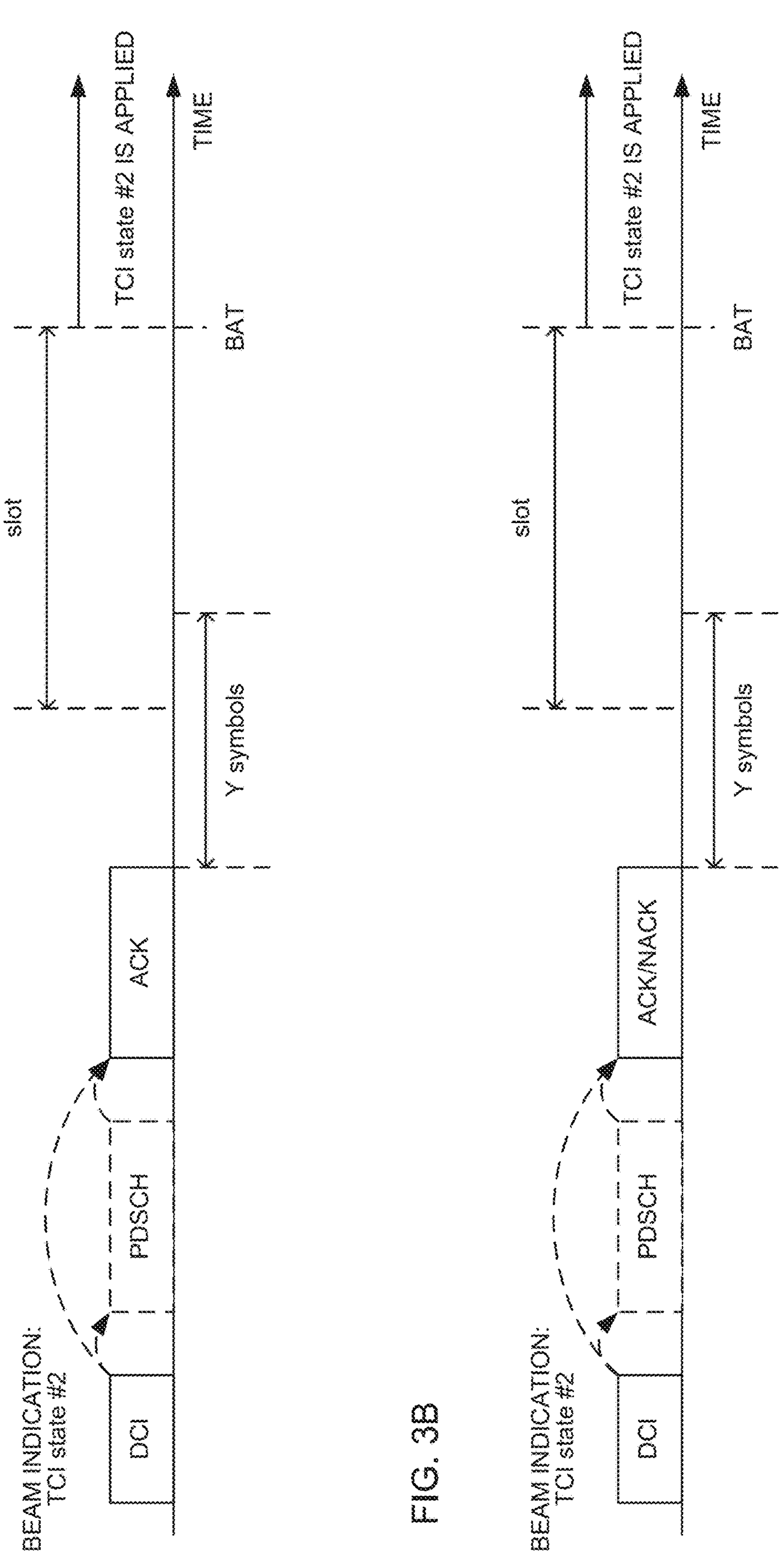

In all or part of the following cases 1 to 4, the opportunity of the BAT may be the ACK for the beam indication. In all or part of the following cases 1 to 4, the BAT may be the first slot after the Y symbol of the ACK transmission (the last symbol of the ACK) in response to the beam indication (FIG. 3A).

[Case 1] A case in which the beam indication DCI is with the DL assignment.

[Case 2] A case in which the beam indication DCI is without the DL assignment.

[Case 3] A case in which the HARQ-ACK codebook for the beam indication is the HARQ-ACK codebook of the type 1/2/3.

[Case 4] A case in which the TCI state indicated by the beam indication is the joint TCI state/the separate TCI state.

<<Aspect 1-2>>

In a first specific case among the cases 1 to 4, the opportunity of the BAT may be the ACK transmission in response to the beam indication. In the first specific case among the cases 1 to 4, the BAT may be the first slot after the Y symbol of the ACK transmission (last symbol of the ACK) in response to the beam indication (FIG. 3A).

Among the cases 1 to 4, in a second specific case different from the first specific case, the opportunity of the BAT may be the ACK/NACK transmission for the beam indication. Among the cases 1 to 4, in the second specific case different from the first specific case, the BAT may be the first slot after the Y symbol of the ACK/NACK transmission (last symbol of the ACK/NACK) in response to the beam indication (FIG. 3B).

The first specific case may be at least one of the following cases A to C.

[Case A] A case in which the beam indication DCI is without the DL assignment (case 2 described above). In this case, since the UE does not receive the PDSCH, the NACK may mean a reception failure (miss) of the DCI (particularly, in the type 1 HARQ-ACK codebook). Therefore, in this case, the opportunity of the BAT is preferably the ACK transmission.

[Case B] A case in which the HARQ-ACK codebook for the beam indication is the type 1 HARQ-ACK codebook (semi-static HARQ-ACK codebook) (a case in which the type 1 HARQ-ACK codebook is configured). In this case, since the UE also transmits the NACK when the reception of the DCI fails, the base station cannot determine whether the NACK is caused by the reception failure of the DCI or the reception failure of the PDSCH. Therefore, in this case, the opportunity of the BAT is preferably the ACK transmission. The first specific case may include the case A and the case B.

[Case C] A case in which the DAI field does not exist in the beam indication DCI. In this case, since there is no DAI field in the DCI, the UE cannot recognize false detection of the DCI. Therefore, in this case, the opportunity of the BAT is preferably the ACK transmission.

The second specific case may be at least one of the following cases Aa to Ca.

[Case Aa] A case in which the beam indication DCI is with the DL assignment (case 1 described above). In the HARQ-ACK codebook other than type 1, the UE transmits the ACK/NACK when the DCI is successfully received, and does not transmit the NACK when reception of the DCI fails. In this case, the base station can determine, by receiving the ACK/NACK, that the DCI is successfully received. In general, an error rate of the DCI is adjusted to about 1% or less (depending on an aggregation level), whereas an error rate of the PDSCH is often higher than the error rate of the DCI. Even if the UE succeeds in receiving the DCI, when the beam update is not performed until the reception of the PDSCH is successful, the delay of the beam update may increase. Therefore, in this case, the opportunity of the BAT is preferably the ACK/NACK transmission. The second specific case may include satisfying the case Aa and the case Ba.

[Case Ba] A case in which the HARQ-ACK codebook for the beam indication is a HARQ-ACK codebook other than type 1 (non-semi-static HARQ-ACK codebook) (a case in which the HARQ-ACK codebook other than type 1 is configured). In the HARQ-ACK codebook other than type 1, the UE transmits the ACK/NACK when the DCI is successfully received, and does not transmit the NACK when reception of the DCI fails. In this case, the base station can determine, by receiving the ACK/NACK, that the DCI is successfully received. In general, an error rate of the DCI is adjusted to about 1% or less (depending on an aggregation level), whereas an error rate of the PDSCH is often higher than the error rate of the DCI. Even if the UE succeeds in receiving the DCI, when the beam update is not performed until the reception of the PDSCH is successful, the delay of the beam update may increase. Therefore, in this case, the opportunity of the BAT is preferably the ACK/NACK transmission. In this case, when the DAI field exists in the beam indication DCI, the UE can recognize that the reception of the beam indication DCI fails. The second specific case may include satisfying the case Ba and the case Ca, or may include satisfying the case Aa, the case Ba, and the case Ca.

[Case Ca] A case in which the DAI field exists in the beam indication DCI. In this case, the UE can recognize that the reception of the beam indication DCI fails.

Therefore, in this case, the opportunity of the BAT is preferably the ACK/NACK transmission.

According to this embodiment, the UE can apply the beam indicated by the DCI at an appropriate timing.

Second Embodiment

This embodiment relates to configuration of the opportunity/trigger of the BAT.

The opportunity of the BAT may be configured/provided by higher layer signaling (RRC IE). Whether the opportunity of the BAT is the ACK transmission or the ACK/NACK transmission may be configured by higher layer signaling. Whether the BAT is the first slot after the Y symbol of the ACK transmission (last symbol of the ACK) for the beam indication or the first slot after the Y symbol of the ACK/NACK transmission (last symbol of the ACK/NACK) for the beam indication may be configured by higher layer signaling.

When the opportunity of the BAT is configured, the UE may determine the BAT based on the configured opportunity.

In all the foregoing cases A, B, C, Aa, Ba, and Ca, the UE may determine the BAT based on the configured opportunity.

In some of the foregoing cases A, B, C, Aa, Ba, and Ca, the UE may determine the BAT based on the configured opportunity. For example, in the second case, the UE may determine the BAT based on the configured opportunity, and in the first case, the UE may determine the BAT based on a specific opportunity (regardless of the configuration of the opportunity). For example, the specific opportunity may be the ACK transmission in response to the beam indication, or may be the ACK/NACK transmission.

When the opportunity of the BAT is not configured, the UE may determine the BAT based on the specific opportunity. For example, the specific opportunity may be the ACK transmission in response to the beam indication, or may be the ACK/NACK transmission.

According to this embodiment, the UE can apply the beam indicated by the DCI at an appropriate timing. In addition, the UE can use an appropriate opportunity depending on the situation.

Other Embodiments

<<UE Capability Information/Higher Layer Parameter>>

A higher layer parameter (RRC IE)/UE capability corresponding to a function (feature) in each of the above embodiments may be defined. The higher layer parameter may indicate whether the function is activated. The UE capability may indicate whether the UE supports the function.

The UE in which the higher layer parameter corresponding to the function is configured may perform the function. "The UE in which the higher layer parameter corresponding to the function is not configured does not perform the function (for example, according to Rel. 15/16)" may be defined.

The UE that has reported/transmitted the UE capability indicating support for the function may perform the function. "The UE that does not report the UE capability indicating support for the function does not perform the function (for example, according to Rel. 15/16)" may be defined.

When the UE reports/transmits the UE capability indicating the support for the function, and a higher layer parameter corresponding to the function is configured, the UE may perform the function. "When the UE does not report/transmit the UE capability indicating the support for the function or the higher layer parameter corresponding to the function is not configured, the UE does not perform the function (for example, according to Rel. 15/16)" may be defined.

Among the foregoing plurality of embodiments, which embodiment/option/choice/function is used may be configured by higher layer parameters, may be reported by the UE as UE capability, may be defined in the specifications, or may be determined by the reported UE capability and the configuration of the higher layer parameters.

The UE capability may indicate whether to support at least one of the following functions.

Unified TCI framework.

One or Both of the Joint TcI and the Separate TcI.

Dynamic unified TCI state indication (beam indication DCI) by DCI. The DCI may include the DCI format 1_1/1_2 with the DL assignment or may include the DCI format 1_1/1_2 without the DL assignment.

The opportunity of the BAT is the ACK transmission, or the opportunity of the BAT is the ACK/NACK transmission. The UE capability may indicate one of at least two of {ACK, ACK-NACK, both}. 'ACK' may indicate that the UE supports the fact that the opportunity of the BAT is the ACK transmission. 'ACK-NACK' may indicate that the UE supports the fact that the opportunity of the BAT is the ACK/NACK transmission. 'both' may indicate that the UE supports both the fact that the opportunity of the BAT is the ACK transmission and the fact that the opportunity of the BAT is the ACK/NACK transmission.

All UEs necessarily support a first opportunity of the BAT, and UEs that additionally support a second opportunity of the BAT may report, as UE capability, supporting the second opportunity of the BAT. For example, the first opportunity may be the ACK transmission and the second opportunity may be the ACK/NACK transmission. For example, the first opportunity may be the NACK/ACK transmission and the second opportunity may be the ACK transmission.

The UE that supports the beam indication DCI necessarily supports the first opportunity of the BAT, and the UE that additionally supports the second opportunity of the BAT may report, as the UE capability, supporting the second opportunity of the BAT. For example, the first opportunity may be the ACK transmission and the second opportunity may be the ACK/NACK transmission. For example, the first opportunity may be the NACK/ACK transmission and the second opportunity may be the ACK transmission.

The UE capability may indicate at least one value of the followings.

The number (maximum number) of TCI states configured for each BWP/each CC/each band/each UE.

The number (maximum number) of active TCI states for each BWP/each CC/each band/each UE.

Value/maximum value/range/candidate of Y [symbol] for BAT.

The value of Y that meets the UE capability may be configured in the UE by the RRC IE.

According to the above UE capability/higher layer parameters, the UE can realize the above functions while maintaining compatibility with existing specifications.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 4:
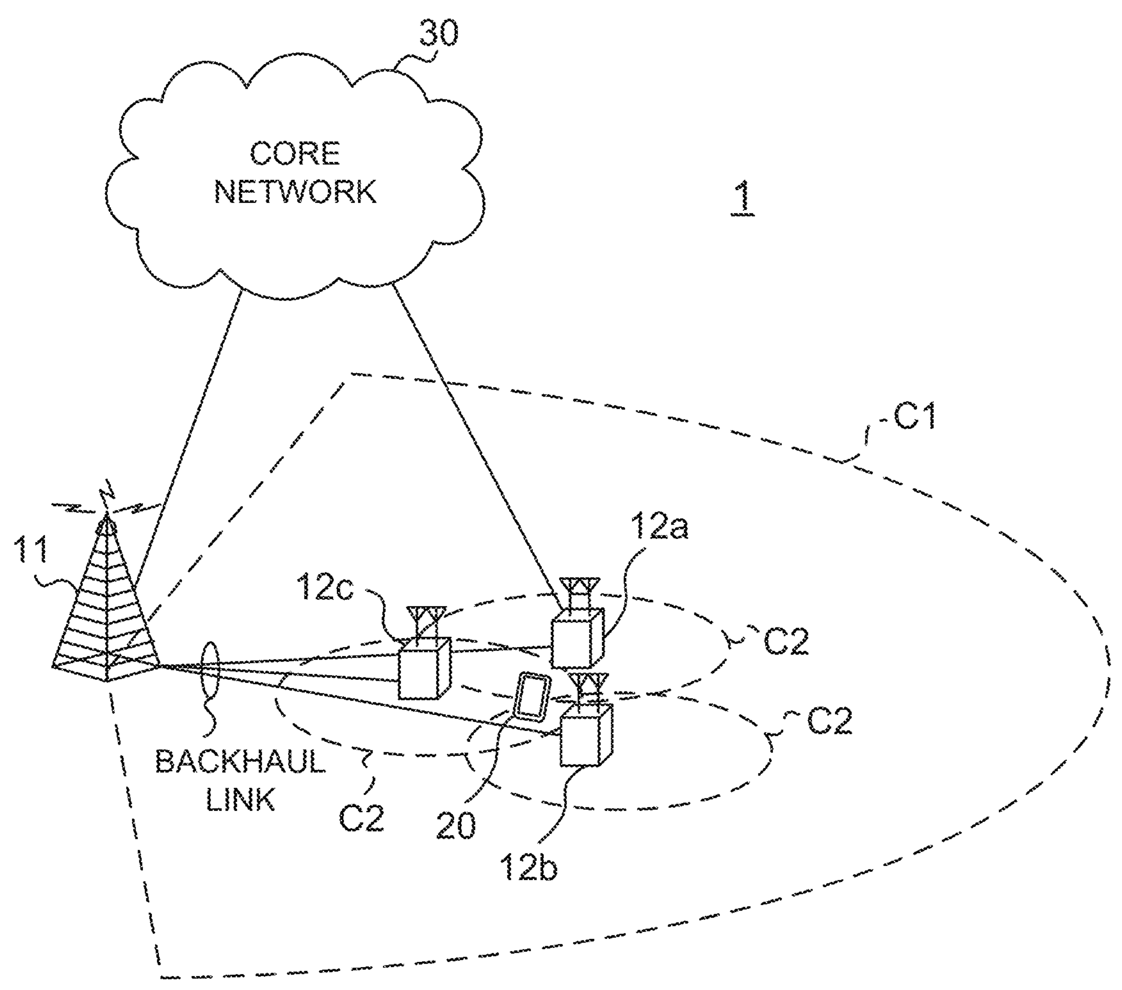
FIG. 4 is a diagram illustrating an example of a schematic configuration of a radio communication system according to one embodiment.

FIG. 4 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs).

The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12*a* to 12*c*) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency band (frequency range 1 (FR1)) or a second frequency band (frequency range 2(FR2)). The macro cell C1 may be included in the FR1, and the small cell C2 may be included in the FR2. For example, the FR1 may be a frequency band of 6 GHz or less (sub-6 GHz), and the FR 2 may be a frequency band higher than 24 GHz (above-24 GHz). It is noted that the frequency bands, definitions, and the like of the FR1 and FR2 are not limited thereto, and, for example, the FR1 may correspond to a frequency band higher than the FR2.

Further, the user terminal 20 may perform communication on each CC using at least one of time division duplex (TDD) and frequency division duplex (FDD).

The plurality of base stations 10 may be connected to each other in a wired manner (for example, an optical fiber, an X2 interface, or the like in compliance with common public radio interface (CPRI)) or in a radio manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may be a terminal that corresponds to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. It is noted that in the radio communication system 1, another radio access method (for example, another single carrier transmission method or another multi-carrier transmission method) may be used as the UL and DL radio access method.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by the user terminals 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. The user data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH and the PUSCH.

It is noted that the DCI that schedules the PDSCH may be referred to as DL assignment, DL DCI, or the like, and the DCI that schedules PUSCH may be referred to as UL grant, UL DCI, or the like. It is noted that the PDSCH may be interchangeable with DL data, and the PUSCH may be interchangeable with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. UE may monitor CORESET associated with a certain search space based on search space configuration.

One search space may correspond to a PDCCH candidate corresponding to one or more aggregation levels. One or more search spaces may be referred to as a search space set. It is noted that "search space", "search space set", "search space configuration", "search space set configuration", "CORESET", "CORESET configuration", and the like in the present disclosure may be interchangeable with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), and scheduling request (SR) may be transmitted on the PUCCH. A random access preamble for establishing connection with a cell may be transmitted on the PRACH.

It is noted that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) and a secondary synchronization signal (SSS). A signal block including the SS (PSS or SSS) and the PBCH (and the DMRS for the PBCH) may be referred to as an SS/PBCH block, an SS block (SSB), or the like. It is noted that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). It is noted that, the DMRSs may be referred to as "user terminal-specific reference signals (UE-specific reference signals)".

(Base Station)

Figure 5:
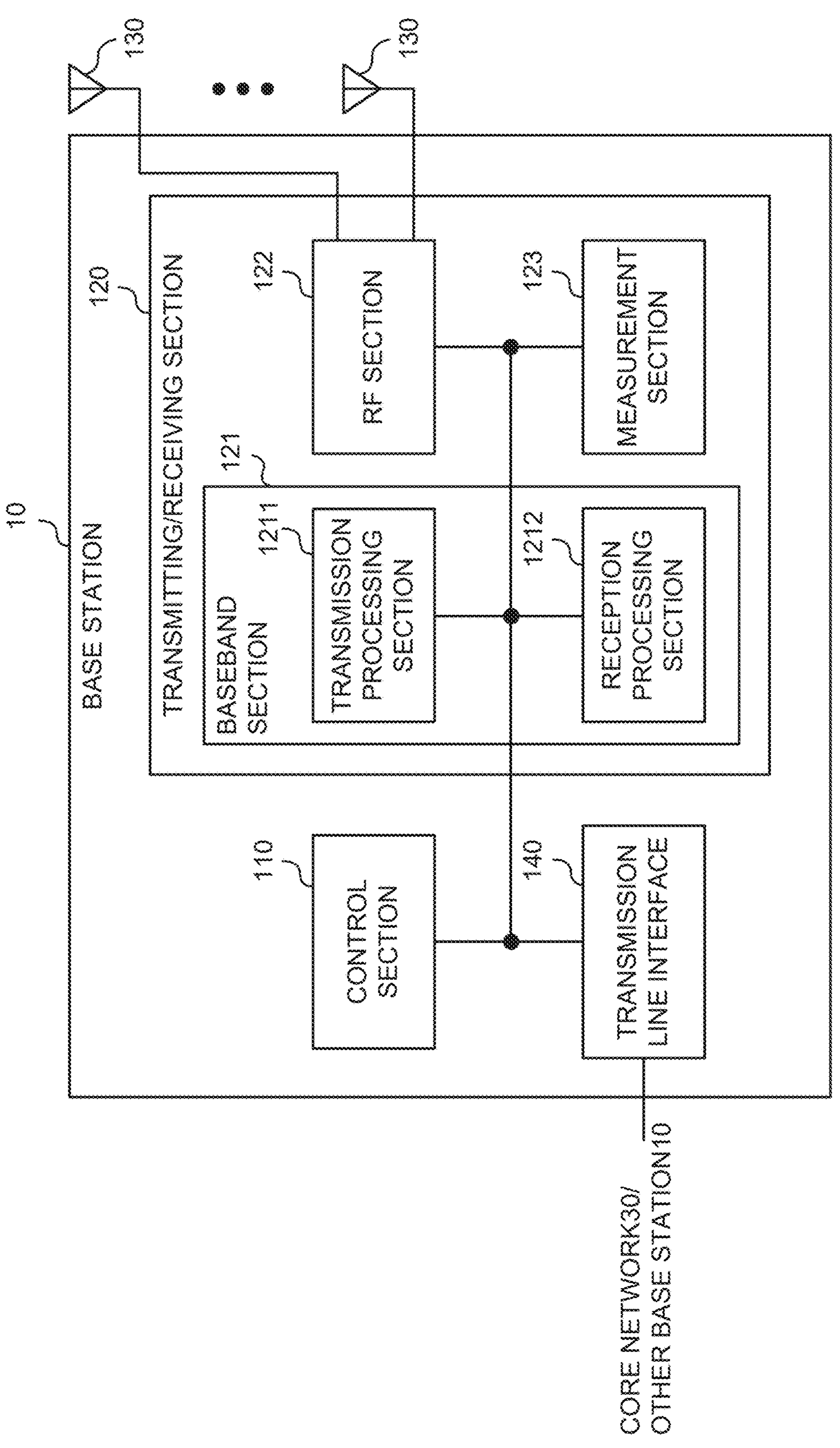
FIG. 5 is a diagram illustrating an example of a configuration of a base station according to one embodiment.

FIG. 5 is a diagram illustrating an example of a configuration of the base station according to one embodiment. The base station 10 includes a control section 110, a transmitting/receiving section 120, a transmitting/receiving antenna 130, and a transmission line interface 140. It is noted that one or more of the control sections 110, one or more of the transmitting/receiving sections 120, one or more of the transmitting/receiving antennas 130, and one or more of the transmission line interfaces 140 may be included.

It is noted that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may include the transmission processing section 1211 and the RF section 122. The receiving section may be constituted by the reception processing section 1212, the RF section 122, and the measurement section 123.

The transmitting/receiving antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam or a reception beam using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmitting/receiving antenna 130.

Meanwhile, the transmitting/receiving section 120 (RF section 122) may perform amplification, filtering processing, demodulation to a baseband signal, and the like on the signal in the radio frequency band received by the transmitting/receiving antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. A measurement result may be output to the control section 110.

The transmission line interface 140 may transmit/receive a signal (backhaul signaling) to and from an apparatus included in the core network 30, another base stations 10, and the like, and may acquire, transmit, and the like user data (user plane data), control plane data, and the like for the user terminal 20.

It is noted that, the transmitting section and the receiving section of the base station 10 in the present disclosure may include at least one of the transmitting/receiving section 120, the transmitting/receiving antenna 130, and the transmission line interface 140.

The transmitting/receiving section 120 may transmit a downlink control information (DCI) format indicating a transmission configuration indication (TCI) state. The control section 110 may apply the TCI state to a plurality of types of at least one of the channel and the signal at a timing after at least a specific time from uplink reception based on the DCI format. In a first case, the uplink reception may be a positive acknowledgement based on the DCI format. In a second case different from the first case, the uplink reception may be the positive acknowledgement or a negative acknowledgement based on the DCI format.

(User Terminal)

Figure 6:
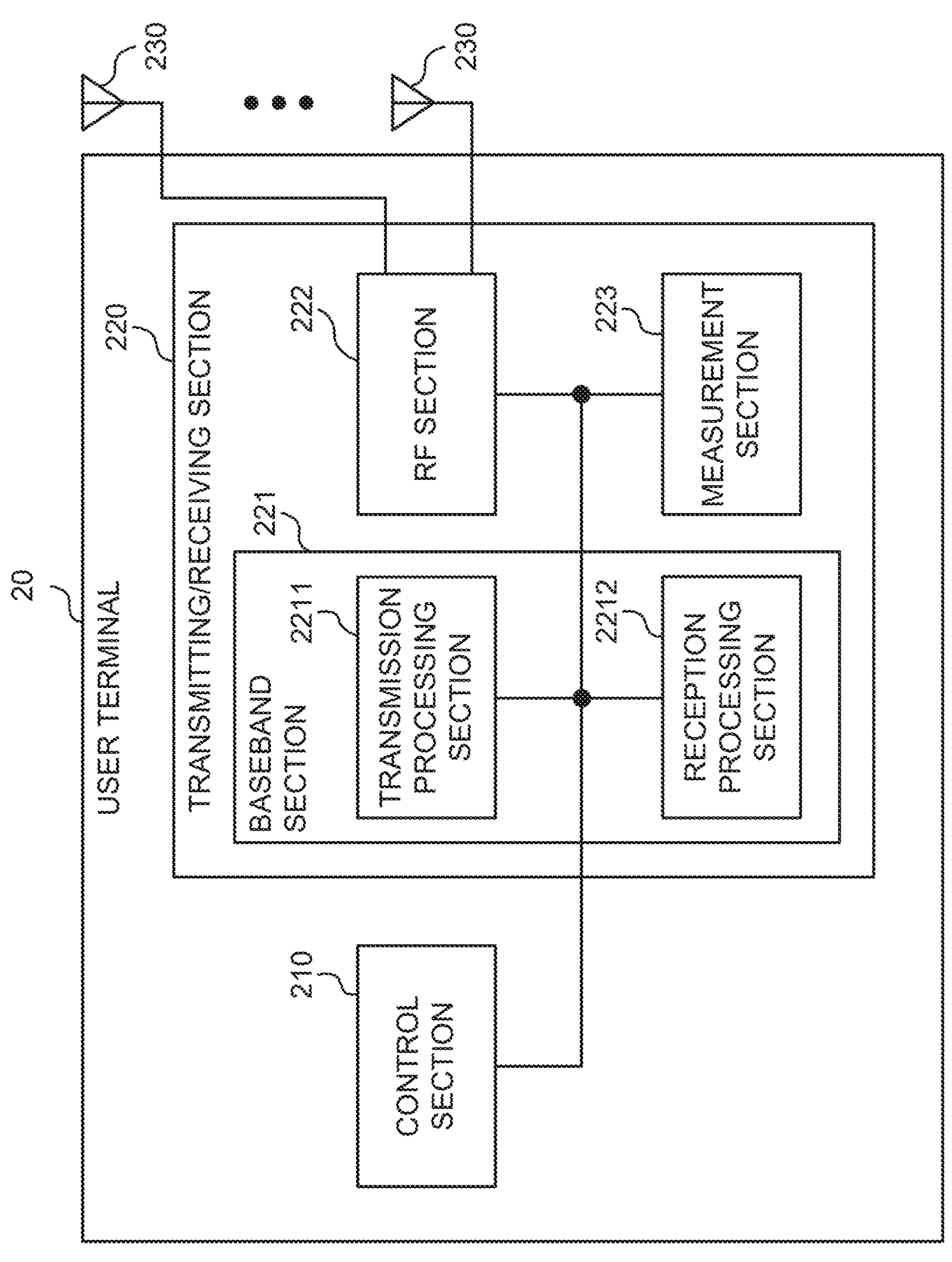
FIG. 6 is a diagram illustrating an example of a configuration of a user terminal according to one embodiment.

FIG. 6 is a diagram illustrating an example of a configuration of the user terminal according to one embodiment. The user terminal 20 includes a control section 210, a transmitting/receiving section 220, and a transmitting/receiving antenna 230. It is noted that one or more of the control sections 210, one or more of the transmitting/receiving sections 220, and one or more of the transmitting/receiving antennas 230 may be included.

It is noted that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described based on common recognition in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212.

The transmitting/receiving section 220 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may be configured by the reception processing section 2212, the RF section 222, and the measurement section 223.

The transmitting/receiving antenna 230 can include an antenna that is described based on common recognition in the technical field related to the present disclosure, for example, an array antenna or the like.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

It is noted that whether to apply DFT processing may be determined based on configuration of transform precoding. In a case where transform precoding is enabled for a certain channel (for example, PUSCH), the transmitting/receiving section 220 (transmission processing section 2211) may perform DFT processing as the transmission processing in order to transmit the channel using a DFT-s-OFDM waveform, and otherwise, DFT processing need not be performed as the transmission processing.

The transmitting/receiving section 220 (RF section 222) may perform modulation to a radio frequency band, filtering processing, amplification, and the like on the baseband signal, to transmit a signal in the radio frequency band via the transmitting/receiving antenna 230.

Meanwhile, the transmitting/receiving section 220 (RF section 222) may perform amplification, filtering processing, demodulation to a baseband signal, and the like on the signal in the radio frequency band received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. A measurement result may be output to the control section 210.

It is noted that the transmitting section and the receiving section of the user terminal 20 in the present disclosure may include at least one of the transmitting/receiving section 220 and the transmitting/receiving antenna 230.

The transmitting/receiving section 220 may receive a downlink control information (DCI) format indicating a transmission configuration indication (TCI) state. The control section 210 may apply the TCI state to a plurality of types of at least one of the channel and the signal at a timing after at least a specific time from uplink transmission based on the DCI format. In a first case, the uplink transmission may be a positive acknowledgement based on the DCI format. In a second case different from the first case, the uplink transmission may be the positive acknowledgement or a negative acknowledgement based on the DCI format.

The first case may include at least one of a case in which the DCI format is without a downlink assignment, a case in which a semi-static hybrid automatic repeat request acknowledgement (HARQ-ACK) codebook is configured, and a case in which the DCI format does not include a downlink assignment indicator.

The second case may include at least one of a case in which the DCI format is with the downlink assignment, a case in which a non-semi-static hybrid automatic repeat request acknowledgement (HARQ-ACK) codebook is configured, and a case in which the DCI format includes the downlink assignment indicator.

The second case may include a case in which it is configured that the uplink transmission is the positive acknowledgement or the negative acknowledgement.

(Hardware Configuration)

It is noted that the block diagrams that have been used to describe the above embodiments illustrate blocks in functional units. These functional blocks (components) are implemented in arbitrary combinations of at least one of hardware and software. Further, the method of implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional blocks may be implemented by combining software with the above-described single apparatus or the above-described plurality of apparatuses.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like.

For example, a functional block (component) that has a transmission function may be referred to as a transmitting section (transmitting unit), a transmitter, and the like. In any case, as described above, the implementation method is not particularly limited.

Figure 7:
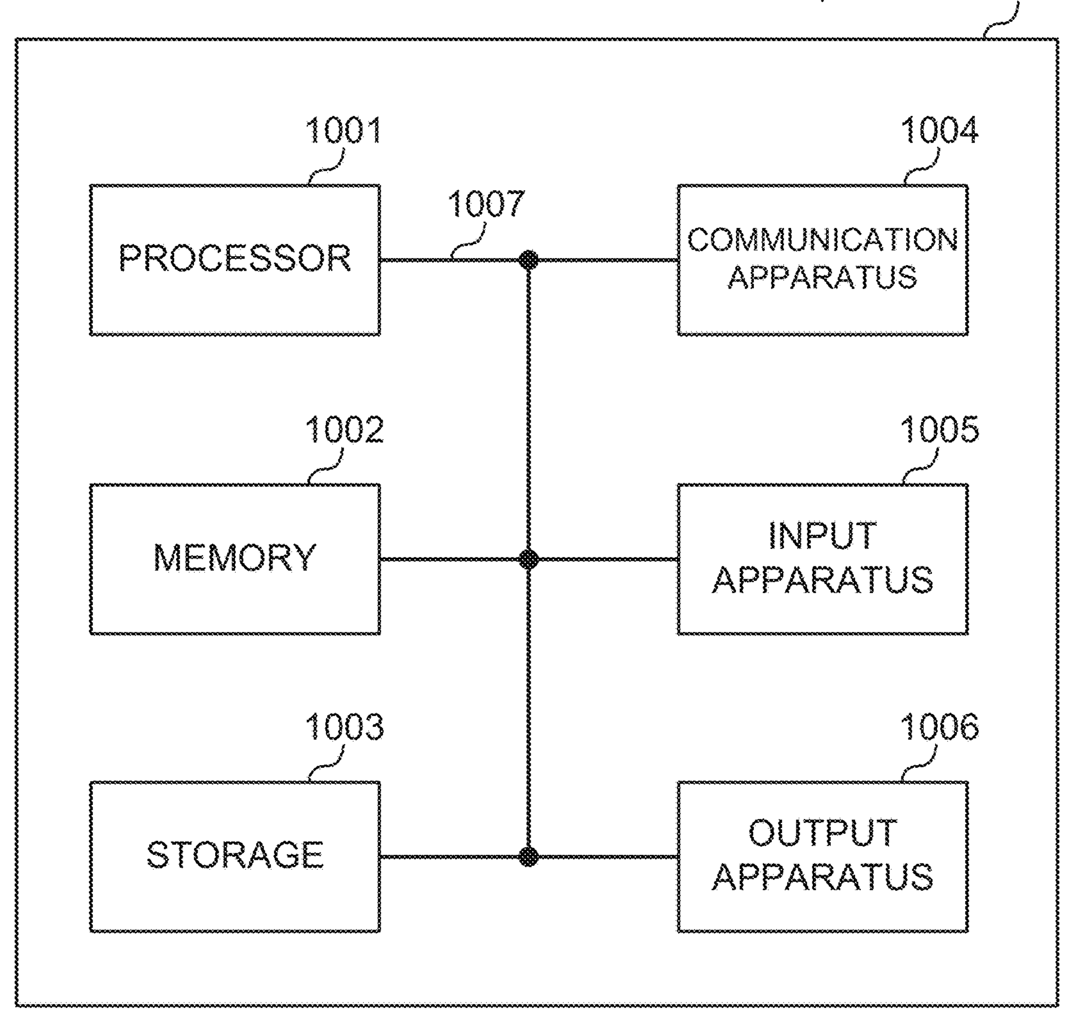
FIG. 7 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 7 is a diagram illustrating an example of the hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

It is noted that in the present disclosure, the terms such as an apparatus, a circuit, a device, a section, and a unit can be interchangeable with each other. The hardware configuration of the base station 10 and the user terminal 20 may be designed to include one or more of the apparatuses illustrated in the drawings, or may be designed not to include some apparatuses.

For example, although only one processor 1001 is illustrated, a plurality of processors may be included. Further, the processing may be executed by one processor, or the processing may be executed by two or more processors simultaneously or sequentially, or using other methods. It is noted that the processor 1001 may be implemented by one or more chips.

Each function of the base station 10 and the user terminal 20 is implemented by certain software (program) being read on hardware such as the processor 1001 and the memory 1002, by which the processor 1001 performs operations, controlling communication via the communication apparatus 1004, and controlling at least one of reading and writing of data at the memory 1002 and the storage 1003.

The processor 1001 controls the entire computer by, for example, operating an operating system. The processor 1001 may be implemented by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

The processor 1001 reads programs (program codes), software modules, data, and the like from at least one of the storage 1003 and the communication apparatus 1004 into the memory 1002, and performs various types of processing according to these. As the program, a program that causes a computer to execute at least a part of the operations described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), and other appropriate storage media. The memory 1002 may be referred to as a register, a cache, a main memory (primary storage apparatus), and the like. The memory 1002 can store programs (program codes), software modules, and the like that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD- ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, and other appropriate storage media. The storage 1003 may be referred to as a “secondary storage apparatus”.

The communication apparatus 1004 is hardware (transmission/reception device) for performing inter-computer communication via at least one of a wired network and a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by physically or logically separating the transmitting section 120*a* (220*a*) and the receiving section 120*b* (220*b*) from each other.

The input apparatus 1005 is an input device for receiving input from the outside (for example, a keyboard, a mouse, a microphone, a switch, a button, a sensor, and the like). The output apparatus 1006 is an output device that performs output to the outside (for example, a display, a speaker, a light emitting diode (LED) lamp, or the like). It is noted that the input apparatus 1005 and the output apparatus 1006 may be an integrated configuration (for example, touch panel).

The apparatuses such as the processor 1001 and the memory 1002 are connected by the bus 1007 for communicating information. The bus 1007 may be formed using a single bus, or may be formed using different buses for each apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented using at least one of these pieces of hardware.

(Modifications)

It is noted that terms described in the present disclosure and terms necessary for understanding the present disclosure may be replaced with terms that have the same or similar meanings. For example, a channel, a symbol, and a signal (signal or signaling) may be interchangeable with one another. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in the time domain. Each of the one or more periods (frames) included in the radio frame may be referred to as a subframe. Further, the subframe may include one or more slots in the time domain.

The subframe may be a fixed time duration (for example, 1 ms) that is not dependent on numerology.

Here, the numerology may be a communication parameter used for at least one of transmission and reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, and specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). Also, the slot may be a time unit based on numerology.

The slot may include a plurality of mini slots. Each mini slot may include one or more symbols in the time domain. Further, the mini slot may be referred to as a sub-slot. Each mini slot may include fewer symbols than the slot. A PDSCH (or PUSCH) transmitted in a time unit larger than the mini slot may be referred to as “PDSCH (PUSCH) mapping type A”. A PDSCH (or a PUSCH) transmitted using a mini slot may be referred to as PDSCH (PUSCH) mapping type B.

A radio frame, a subframe, a slot, a mini slot, and a symbol each represent a time unit in signal transmission. The radio frame, the subframe, the slot, the mini slot, and the symbol may be called by other applicable names, respectively. It is noted that time units such as a frame, a subframe, a slot, a mini slot, and a symbol in the present disclosure may be interchangeable with each other.

For example, one subframe may be referred to as TTI, a plurality of consecutive subframes may be referred to as TTI, or one slot or one mini slot may be referred to as TTI. That is, at least one of the subframe and the TTI may be a subframe (1 ms) in the existing LTE, may be a period shorter than 1 ms (for example, one to thirteen symbols), or may be a period longer than 1 ms. It is noted that a unit representing a TTI may be referred to as a slot, a mini slot, or the like instead of a subframe.

Here, a TTI refers to, for example, a minimum time unit of scheduling in radio communication. For example, in the LTE system, a base station performs scheduling to allocate radio resources (a frequency bandwidth, transmit power, and the like that can be used in each user terminal) to each user terminal in TTI units. It is noted that the definition of a TTI is not limited to this.

A TTI may be a transmission time unit of a channel-coded data packet (transport block), a code block, a codeword, and the like or may be a processing unit of scheduling, link adaptation, and the like It is noted that, when a TTI is given, a time interval (for example, the number of symbols) to which a transport block, a code block, a codeword, or the like is actually mapped may be shorter than the TTI.

It is noted that, when one slot or one mini slot is referred to as a TTI, one or more TTIs (that is, one or more slots or one or more mini slots) may be a minimum time unit of scheduling. The number of slots (the number of mini slots) constituting the minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

It is noted that, a long TTI (such as a usual TTI or a subframe) may be replaced with a TTI having a time duration exceeding 1 ms. A short TTI (such as a shortened TTI) may be replaced with a TTI having a TTI length less than the TTI length of a long TTI and more than or equal to 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in an RB may be determined based on a numerology.

An RB may include one or more symbols in the time domain, and may have a length of one slot, one mini slot, one subframe, or one TTI. One TTI, one subframe, and the like may each include one or more resource blocks.

It is noted that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource domain of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. PRBs may be defined in a BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE does not have to assume transmission/reception of a certain signal/channel outside the active BWP. It is noted that a "cell", a "carrier", and the like in the present disclosure may be interchangeable with "BWP".

It is noted that the structures of radio frames, subframes, slots, mini slots, symbols, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

The information, parameters, and the like described in the present disclosure may be represented using absolute values, or may be represented using relative values with respect to certain values, or may be represented using other corresponding information. For example, a radio resource may be indicated by a certain index.

The names used for parameters and the like in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, and the like described in the present disclosure may be represented using any of a variety of different technologies. For example, data, an instruction, a command, information, a signal, a bit, a symbol, a chip, and the like, which may be referred to throughout the above description, may be represented by a voltage, a current, an electromagnetic wave, a magnetic field or a magnetic particle, an optical field or an optical photon, or any combination of these.

Information, signals, and the like can be output in at least one of a direction from a higher layer to a lower layer or a direction from a lower layer to a higher layer. Information, signals, and the like may be input and output via a plurality of network nodes.

Input and output information, signals, and the like may be stored in a specific location (for example, memory), or may be managed using a measurement table. The input/output information, signals, and the like can be overwritten, updated, or appended. The output information, signals, and the like may be deleted. Information, signals, and the like that have been input may be transmitted to another apparatus.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

It is noted that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC Connection Setup message, an RRC Connection Reconfiguration message, and the like. Further, notification of the MAC signaling may be performed using, for example, a MAC control element (CE).

Also, notification of certain information (for example, notification of information to the effect that "X holds") does not necessarily have to be sent explicitly, and can be sent implicitly (for example, by not notifying this certain information, by reporting another piece of information, and the like).

Determination may be performed using a value represented by one bit (0 or 1), or may be performed using a Boolean represented by true or false, or may be performed by comparing numerical values (for example, comparison with a certain value).

Software, regardless of whether it is referred to as software, firmware, middleware, microcode, or a hardware description language, or referred to by another name, should be interpreted broadly to mean an instruction, an instruction set, a code, a code segment, a program code, a program, a subprogram, a software module, an application, a software application, a software package, a routine, a subroutine, an object, an executable file, an execution thread, a procedure, a function, and the like.

Moreover, software, instructions, information, and the like may be transmitted and received via communication media. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station and the base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be referred to as a transmission apparatus, a reception apparatus, a radio communication apparatus, and the like. It is noted that at least one of the base station or the mobile station may be a device mounted on a moving body (moving object), a moving body itself, and the like.

The moving body refers to a movable object, the moving speed is arbitrary, and naturally includes a case in which the moving body is stopped. The moving body includes, for example, a vehicle, a transport vehicle, an automobile, a motorcycle, a bicycle, a connected car, an excavator, a bulldozer, a wheel loader, a dump truck, a forklift, a train, a bus, a rear car, a human-powered vehicle, a ship and other watercraft, an airplane, a rocket, an artificial satellite, a drone, a multicopter, a quadcopter, a balloon, and objects mounted thereon, and is not limited thereto. Further, the moving body may be a moving body that autonomously travels based on an operation command.

The moving body may be a transportation (for example, a car, an airplane, or the like), an unmanned moving body (for example, a drone, an autonomous car, or the like), or a (manned or unmanned) robot. It is noted that at least one of the base station and the mobile station also includes an apparatus that does not necessarily move during a communication operation. For example, at least one of the base station and the mobile station may be an Internet of Things (IoT) device such as a sensor.

Figure 8:
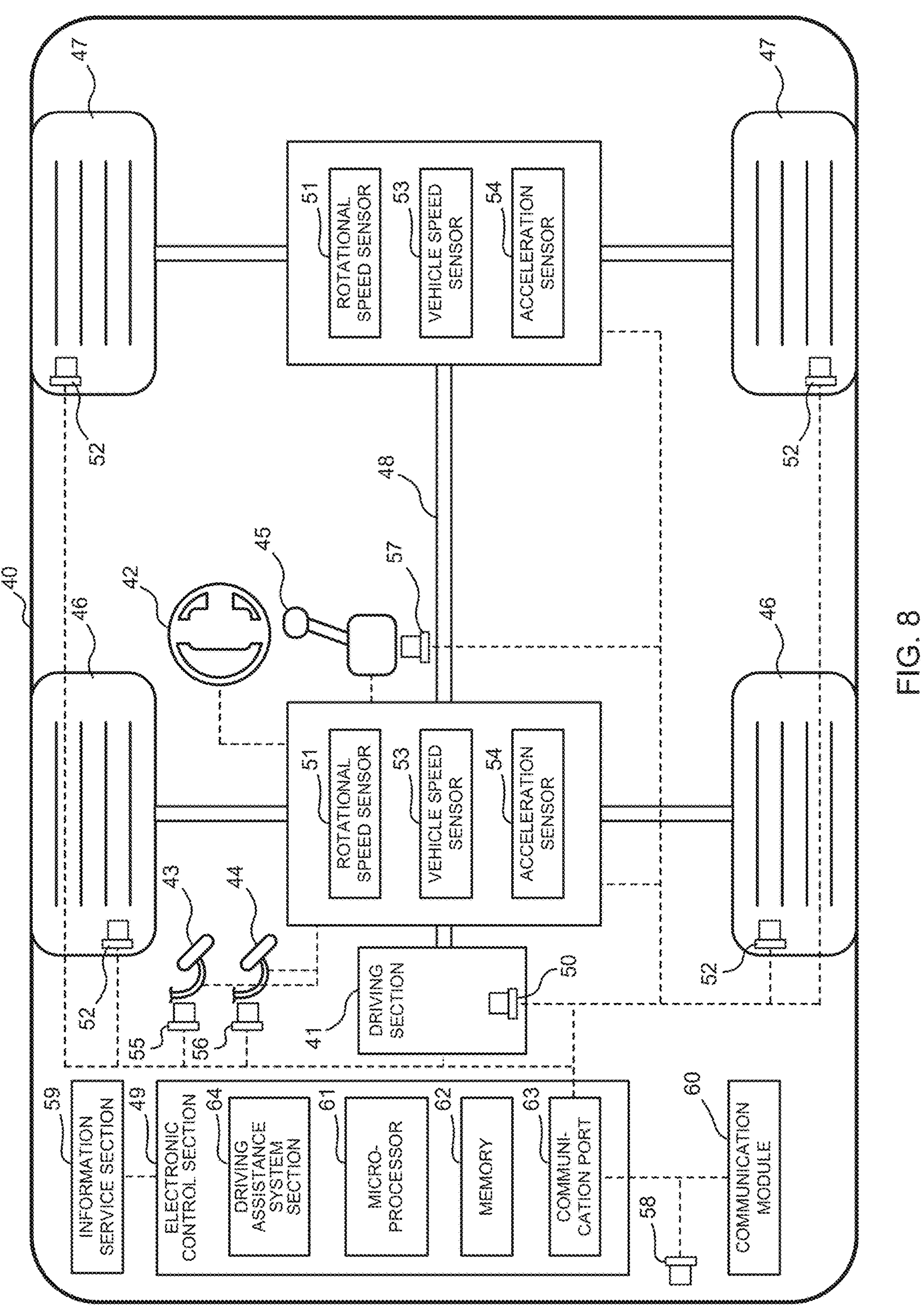
FIG. 8 is a diagram illustrating an example of a vehicle according to one embodiment.

FIG. 8 is a diagram illustrating an example of a vehicle according to one embodiment. A vehicle 40 includes a drive unit 41, a steering unit 42, an accelerator pedal 43, a brake pedal 44, a shift lever 45, left and right front wheels 46, left and right rear wheels 47, an axle 48, an electronic control unit 49, various sensors (includes a current sensor 50, a rotation speed sensor 51, an air pressure sensor 52, a vehicle speed sensor 53, an acceleration sensor 54, an accelerator pedal sensor 55, a brake pedal sensor 56, a shift lever sensor 57, and an object detection sensor 58), an information service unit 59, and a communication module 60.

The drive unit 41 includes, for example, at least one of an engine, a motor, and a hybrid of an engine and a motor. The steering unit 42 includes at least a steering wheel (also referred to as a handle), and is configured to steer at least one of the front wheel 46 and the rear wheel 47 based on the operation of the steering wheel operated by a user.

The electronic control unit 49 includes a microprocessor 61, a memory (ROM, RAM) 62, and a communication port (for example, an input/output (IO) port) 63. Signals from the various sensors 50 to 58 provided in the vehicle are input to the electronic control unit 49. The electronic control unit 49 may be referred to as an electronic control unit (ECU).

The signals from the various sensors 50 to 58 include a current signal from the current sensor 50 that senses the current of the motor, a rotation speed signal of the front wheel 46/the rear wheel 47 acquired by the rotation speed sensor 51, an air pressure signal of the front wheel 46/the rear wheel 47 acquired by the air pressure sensor 52, a vehicle speed signal acquired by the vehicle speed sensor 53, an acceleration signal acquired by the acceleration sensor 54, a depression amount signal of the accelerator pedal 43 acquired by the accelerator pedal sensor 55, a depression amount signal of the brake pedal 44 acquired by the brake pedal sensor 56, an operation signal of the shift lever 45 acquired by the shift lever sensor 57, a detection signal for detecting an obstacle, a vehicle, a pedestrian, and the like acquired by the object detection sensor 58, and the like.

The information service unit 59 includes various devices for providing (outputting) various types of information such as driving information, traffic information, and entertainment information, such as a car navigation system, an audio system, a speaker, a display, a television, and a radio, and one or more ECUs that control these devices. The information service unit 59 provides various types of information/services (for example, multimedia information/multimedia services) to an occupant of the vehicle 40 using information acquired from an external device via the communication module 60 or the like.

The information service unit 59 may include an input device (for example, a keyboard, a mouse, a microphone, a switch, a button, a sensor, a touch panel, or the like) that receives an input from the outside, or may include an output device (for example, a display, a speaker, an LED lamp, a touch panel, or the like) that performs an output to the outside.

A driving assistance system unit 64 includes various devices for providing functions for preventing an accident in advance and reducing a driving load of a driver, such as a millimeter wave radar, light detection and ranging (LiDAR), a camera, a positioning locator (for example, global navigation satellite system (GNSS) or the like), map information (for example, a high definition (HD) map, an autonomous vehicle (AV) map, and the like), a gyro system (for example, an inertial measurement unit (IMU), an inertial navigation system (INS), or the like), an artificial intelligence (AI) chip, and an AI processor, and one or more ECUs for controlling these devices. Further, the driving assistance system unit 64 also transmits and receives various types of information via the communication module 60 so as to achieve a driving assistance function or an automatic driving function.

The communication module 60 can communicate with the microprocessor 61 and components of the vehicle 40 via the communication port 63. For example, the communication module 60 transmits and receives data (information) to and from the drive unit 41, the steering unit 42, the accelerator pedal 43, the brake pedal 44, the shift lever 45, the left and right front wheels 46, the left and right rear wheels 47, the axle 48, the microprocessor 61 and the memory (ROM, RAM) 62 in the electronic control unit 49, and the various sensors 50 to 58 provided in the vehicle 40 via the communication port 63.

The communication module 60 is a communication device that can be controlled by the microprocessor 61 of the electronic control unit 49 and can communicate with an external device. For example, various types of information are transmitted and received to and from an external device via radio communication. The communication module 60 may be either inside or outside the electronic control unit 49. The external device may be, for example, the base station 10, the user terminal 20, or the like described above. Furthermore, the communication module 60 may be, for example, at least one of the base station 10 and the user terminal 20 described above (may function as at least one of the base station 10 and the user terminal 20).

The communication module 60 may transmit at least one of the above-described signals from the various sensors 50 to 58 input to the electronic control unit 49, information obtained based on the signals, and information based on an input from the outside (user) obtained via the information service unit 59 to the external device via radio communication. The electronic control unit 49, the various sensors 50 to 58, the information service unit 59, and the like may be referred to as input units that receive inputs. For example, the PUSCH transmitted by the communication module 60 may include information based on the above input.

The communication module 60 receives various types of information (traffic information, traffic signal information, inter-vehicle information, and the like) transmitted from an external device, and displays the information on the information service unit 59 provided in the vehicle. The information service unit 59 may be referred to as an output unit that outputs information (for example, information is output to a device such as a display or a speaker based on a PDSCH (or data/information decoded from the PDSCH) received by the communication module 60).

The communication module 60 also stores various types of information received from external devices in the memory 62 available by the microprocessor 61. Based on the information stored in the memory 62, the microprocessor 61 may control the drive unit 41, the steering unit 42, the accelerator pedal 43, the brake pedal 44, the shift lever 45, the left and right front wheels 46, the left and right rear wheels 47, the axle 48, the various sensors 50 to 58, and the like provided in the vehicle 40.

The base station in the present disclosure may be interchangeable with a user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. In addition, the terms such as "uplink" and "downlink" may be interchangeable with terms corresponding to terminal-to-terminal communication (for example, "sidelink"). For example, an uplink channel, a downlink channel, and the like may be interchangeable with a sidelink channel.

Similarly, the user terminal in the present disclosure may be replaced with a base station. In the case, the base station 10 may have the function of the above-mentioned user terminal 20.

In the present disclosure, the operation performed by the base station may be performed by an upper node thereof in some cases. In a network including one or a plurality of network nodes with a base station, it is clear that various operations performed for communication with a terminal can be performed by a base station, one or more network nodes (for example, mobility management entity (MME) and serving-gateway (S-GW) are possible, but are not limitations) other than the base station, or a combination thereof.

Each aspect/embodiment described in the present disclosure may be used alone, used in combination, or switched in association with execution. Further, the order of processing procedures, sequences, flowcharts, and the like of the aspects/embodiments described in the present disclosure may be re-ordered as long as there is no inconsistency. For example, for the method described in the present disclosure, various step elements are presented by using an illustrative order, and the method is not limited to the presented specific order.

Each aspect/embodiment described in the present disclosure may be applied to a system using Long-Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG(x is, for example, an integer or decimal)), Future Radio Access (FRA), New-Radio Access Technology (RAT), New Radio (NR), New radio access (NX), Future generation radio access (FX), Global System for Mobile communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system extended, modified, generated, or prescribed based on those described above, and the like. Further, a plurality of systems may be combined (for example, a combination of LTE or LTE-A and 5G, and the like) and applied.

The phrase "based on" used in the present disclosure does not mean "based only on", unless otherwise specified. In other words, the phrase "based on" means both "based only on" and "based at least on".

Any reference to an element using designations such as "first" and "second" used in the present disclosure does not generally limit the amount or order of these elements. These designations can be used in the present disclosure, as a convenient way of distinguishing between two or more elements. In this way, reference to the first and second elements does not imply that only two elements may be employed, or that the first element must precede the second element in some way.

The term "determining" used in the present disclosure may include a wide variety of operations. For example, "determining" may be regarded as "determining" judging, calculating, computing, processing, deriving, investigating, looking up, search, inquiry (for example, looking up in table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

"Determining" may be interchangeable with "assuming", "expecting", "considering", and the like.

The "maximum transmit power" described in the present disclosure may mean the maximum value of the transmit power, may mean the nominal UE maximum transmit power, or may mean the rated UE maximum transmit power.

The terms "connected" and "coupled" used in the present disclosure, or all variations thereof mean all direct or indirect connections or coupling between two or more elements, and can include the presence of one or more intermediate elements between two elements "connected" or "coupled" with each other. The coupling or connection between the elements may be physical, logical, or a combination of these. For example, the term "connection" is interchangeable with "access".

In the present disclosure, when two elements are connected, the two elements can be considered to be "connected" or "coupled" with each other by using one or more electrical wires, cables, printed electrical connections, and the like, and using, as some non-limiting and non-inclusive examples, electromagnetic energy and the like having a wavelength in a radio frequency domain, a microwave domain, and an optical (both visible and invisible) domain.

In the present disclosure, the phrase "A and B are different" may mean "A and B are different from each other". It is noted that the phrase may mean that "A and B are different from C". The terms such as "leave", "coupled", and the like may be interpreted similarly to "different".

In the present disclosure, when "include", "including", and variations thereof are used, these terms are intended to be inclusive similarly to the term "comprising". The term "or" used in the present disclosure is intended not to be an exclusive-OR.

In the present disclosure, when articles in English such as "a", "an", and "the" are added in translation, the present disclosure may include the plural forms of nouns that follow these articles.

Although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples, and should by no means be construed to limit the invention according to the present disclosure in any way.

The present application is based on Japanese Patent Application No. 2021-185044 filed on Nov. 12, 2021. The contents of the present application are all incorporated herein.

The invention claimed is:

1. A terminal comprising:

a receiver that receives a configuration of a hybrid automatic repeat request acknowledgement (HARQ-ACK) codebook including HARQ-ACK information for all HARQ processes and all component carriers (CCs) configured in a physical uplink control channel (PUCCH) group, and receives downlink control information (DCI) including a request for the HARQ-ACK codebook and an indication to update one or two first transmission configuration indication (TCI) states applied to downlink and uplink to one or two second TCI states; and a processor that, when the HARQ-ACK codebook includes a positive acknowledgement for the DCI, updates the one or two first TCI states to the one or two second TCI states in a first slot after a specific time elapses from transmission of the HARQ-ACK codebook.

2. The terminal according to claim 1, wherein the DCI does not schedule a physical downlink shared channel (PDSCH), and the positive acknowledgement corresponds to successful reception of the DCI.

3. The terminal according to claim 1, wherein the DCI schedules a PDSCH, and the positive acknowledgement corresponds to the PDSCH.

4. The terminal according to claim 1, wherein the specific time is based on a smallest subcarrier spacing within a plurality of CCs to which the one or two second TCI states are applied.

5. A radio communication method for a terminal, comprising:

receiving a configuration of a hybrid automatic repeat request acknowledgement (HARQ-ACK) codebook including HARQ-ACK information for all HARQ processes and all component carriers (CCs) configured in a physical uplink control channel (PUCCH) group;

receiving downlink control information (DCI) including a request for the HARQ-ACK codebook and an indication to update one or two first transmission configuration indication (TCI) states applied to downlink and uplink to one or two second TCI states; and when the HARQ-ACK codebook includes a positive acknowledgement for the DCI, updating the one or two first TCI states to the one or two second TCI states in a first slot after a specific time elapses from transmission of the HARQ-ACK codebook.

6. A base station comprising:

a transmitter that transmits a configuration of a hybrid automatic repeat request acknowledgement (HARQ-ACK) codebook including HARQ-ACK information for all HARQ processes and all component carriers (CCs) configured in a physical uplink control channel (PUCCH) group, and transmits downlink control information (DCI) including a request for the HARQ-ACK codebook and an indication to update one or two first transmission configuration indication (TCI) states applied to downlink and uplink to one or two second TCI states; and a processor that, when the HARQ-ACK codebook includes a positive acknowledgement for the DCI, updates the one or two first TCI states to the one or two second TCI states in a first slot after a specific time elapses from transmission of the HARQ-ACK codebook.

7. A system comprising a terminal and a base station, wherein the terminal comprises:

a receiver that receives a configuration of a hybrid automatic repeat request acknowledgement (HARQ-ACK) codebook including HARQ-ACK information for all HARQ processes and all component carriers (CCs) configured in a physical uplink control channel (PUCCH) group, and receives downlink control information (DCI) including a request for the HARQ-ACK codebook and an indication to update one or two first transmission configuration indication (TCI) states applied to downlink and uplink to one or two second TCI states; and a processor that, when the HARQ-ACK codebook includes a positive acknowledgement for the DCI, updates the one or two first TCI states to the one or two second TCI states in a first slot after a specific time elapses from transmission of the HARQ-ACK codebook, and the base station transmits the configuration and transmits the DCI.

* * * * *